(12) United States Patent
Grimm

(10) Patent No.: US 8,293,152 B2
(45) Date of Patent: Oct. 23, 2012

(54) PACKAGING MACHINE AND METHOD FOR MANUFACTURING A PACKAGE

(75) Inventor: Bernhard Grimm, Kempten (DE)

(73) Assignee: Multivac Sepp Haggemueller GmbH & Co. KG (DE)

(*) Notice: Subject to any disclaimer, the term of this patent is extended or adjusted under 35 U.S.C. 154(b) by 210 days.

(21) Appl. No.: 12/582,348

(22) Filed: Oct. 20, 2009

(65) Prior Publication Data

US 2010/0095640 A1    Apr. 22, 2010

(30) Foreign Application Priority Data

Oct. 21, 2008  (DE) .................. 10 2008 052 599

(51) Int. Cl.
*B29C 49/00* (2006.01)
(52) U.S. Cl. ........................ 264/101; 264/571
(58) Field of Classification Search .............. 264/571, 264/101; 53/453, 559
See application file for complete search history.

(56) References Cited

U.S. PATENT DOCUMENTS

| | | | |
|---|---|---|---|
| 3,686,822 A | | 8/1972 | Wolfelsperger |
| 4,165,357 A | * | 8/1979 | Vetter ................. 264/548 |
| 4,229,927 A | | 10/1980 | Day |
| 4,521,175 A | * | 6/1985 | Medwed ............. 425/403 |
| 5,101,611 A | | 4/1992 | Biskup et al. |
| 5,158,786 A | | 10/1992 | Reil et al. |
| 6,257,866 B1 | * | 7/2001 | Fritz et al. ............. 425/387.1 |

FOREIGN PATENT DOCUMENTS

| | | |
|---|---|---|
| DE | 2 122 110 A1 | 3/1972 |
| DE | 37 39 432 C2 | 6/1989 |
| DE | 38 42 135 A1 | 6/1990 |
| DE | 40 05 972 C2 | 8/1991 |
| DE | 91 11 714.3 U1 | 12/1991 |
| DE | 10 2005 061 315 A1 | 6/2007 |
| EP | 1 506 925 A1 | 2/2005 |

OTHER PUBLICATIONS

European Search Report Dated Nov. 11, 2010, Applicant Multivac Sepp Haggemueller GmbH & Co. KG, European Application No. 09013243.2-2308 / 2179928, 6 Pages.
German Search Report Dated Sep. 1, 2009—Application No. 10 2008 052 599.5, 5 Pages.
European Abstract EP0533134A1—Corresponds to DE9111714U1.
Extended European Office Action Dated Sep. 22, 2011, Applicant Multivac Sepp Haggemueller GmbH & Co. KG, European Application No. 09 013 243.2-2308,4 Pages.

* cited by examiner

*Primary Examiner* — Galen Hauth
(74) *Attorney, Agent, or Firm* — Brooks Kushman P.C.

(57) ABSTRACT

Proposed is a method for manufacturing a package out of foil, with a heating process for heating a foil section, as well as a packaging machine (1) for manufacturing a package out of foil, with a heating device (14) for heating a foil section (3') and with a device (17) for generating negative pressures on each of the two sides of the foil section. In order to allow improved coordination of individual manufacturing steps, it is proposed that in a same time interval during the heating process, a negative pressure relative to the ambient pressure is generated on both sides of the foil section (3') during the heating process.

17 Claims, 4 Drawing Sheets

PACKAGING MACHINE AND METHOD FOR MANUFACTURING A PACKAGE

CROSS-REFERENCE TO RELATED APPLICATIONS

This application claims foreign priority benefits under 35 U.S.C. §119(a)-(d) to German application DE 10 2008 052 599.5, filed Oct. 21, 2008, which is hereby incorporated by reference in its entirety.

BACKGROUND OF THE INVENTION

1. Field of the Invention

The invention relates to a method for manufacturing a package, as well as to a packaging machine for manufacturing a package.

2. Background Art

Known from the state of the art are commercially available packaging machines which comprise a forming station, in particular a thermoforming station. Packaging machines of this kind manufacture a package from a top and bottom foil. For example, a cavity is formed in the bottom foil in the thermoforming station. Normally, compressed air is used to press the foil downwards into the bottom part of the moulding tool, while negative pressure is simultaneously applied in the bottom part of the moulding tool to draw the foil into the appropriate shape. In this process, the foil cools at the side walls and on the bottom, whereby corresponding parts of the forming station are also cooled and the foil consequently swiftly solidifies in its formed structure.

In order to press the foil down into the bottom part of the moulding tool, punches are used in the top part in some cases, even for thick foils, in order to support the forming process.

In general, only a certain time span is available for heating, forming and solidifying the foil, depending on which throughput of manufactured packages a corresponding packaging machine is to achieve.

SUMMARY

A method for manufacturing a package and a packaging machine in which or with which it is possible to achieve an improved coordination of individual manufacturing steps are proposed.

A method according to the invention for manufacturing a package out of foil is characterized in that during a heating process, negative pressure relative to the ambient pressure is generated on both sides of a foil section in the same time interval.

The heating process serves to make the pertinent foil formable. By generating a negative pressure, a corresponding force acts on the foil, as a result of which the foil is drawn into the corresponding side. Depending on the side on which the negative pressure is more strongly apparent, the foil is more strongly drawn to one side or the other. This can be used for improved coordination of individual manufacturing steps, particularly provided that the steps follow one another.

It can therefore be particularly advantageous if different negative pressures are generated on the two sides of the foil section at the same point in time. At such a corresponding point in time, the foil is drawn in the direction of the side with the stronger negative pressure. By changing the pressure ratios, this outside force effect can also again be changed in accordance with the manufacturing steps.

In particular, also during a certain time span during the heating process, at least one of these negative pressures can be stationary, meaning that it is constant on the respective side during this time span.

In one embodiment of the invention, the generation of a negative pressure on one of the two sides can begin at a point in time at which a stationary negative pressure has already been generated on the other side, as a result of which the foil is drawn in the corresponding direction. Furthermore, during the heating process, the negative pressures on the two sides of the foil section can be generated in such a way that these, in each case, steadily increase or are held constant with respect to their amount.

As the next manufacturing step, for example, a moulding process for forming the heated foil section could follow the heating process.

It is particularly advantageous if the foil section is heated during the heating process from the side on which the larger negative pressure, with respect to the amount, prevails at the same points in time. Because namely on this corresponding side where the greater negative pressure prevails, the foil is also drawn more strongly in this direction and consequently brought closer to the corresponding heating unit.

This kind of heating of the foil section can be brought about in a simple manner, for example, by means of a heating plate.

For the moulding process, a mould for forming the heated foil section can be present on the side that lies opposite the side with the heating unit. In order to draw the foil correspondingly in the direction of the mould, the negative pressure that prevails on the side on which the heating takes place is reduced. If the negative pressure is less than that on the other side on which the mould is located, the foil is also correspondingly drawn in the direction of the mould. This can also be supported by means of not only reducing the negative pressure in terms of the amount, but additionally going so far as to generate a positive pressure, as a result of which the force that acts on the foil is further increased, so that the corresponding forming process can proceed even more swiftly.

Fundamentally, however, it is also possible to use a form punch in place of the positive pressure or even in addition to the positive pressure.

A packaging machine according to the invention for manufacturing a package out of foil is characterized in that a device for generating negative pressures is formed in order to generate a negative pressure, relative to the ambient pressure, on both sides of a foil section during the same time interval during heating.

In particular, with reference to the moulding of the foil, the method according to the invention or a packaging machine according to the invention possesses a number of advantages. Even as early as during the heating process, air is suctioned away on the side on which the mould is located, in order to generate a corresponding negative pressure. Particularly when the later moulding process of the heated foil proceeds very swiftly, a residual volume of air that has remained on the side of the moulding tool can consequently be reduced in comparison to the case in which the negative pressure is not generated until later. The larger the remaining residual volume of air namely is, the less precisely the heated foil can be adapted to the corresponding mould. Consequently it is made possible to again improve the moulding of, for example, edges and curves. As a result of the time saved because it is not necessary first to generate a negative pressure on the side of the mould, the formation of the heated foil can take place considerably more swiftly. As a result, the foil also generally does not cool off as strongly during the actual moulding process itself.

This early extraction of air during the heating process in the area in which the mould is located makes it possible to reduce the risk that the air cannot escape swiftly enough, particularly as a result of flow resistances caused by small bore holes, gaps in mould inserts, supporting plates, etc., and that an air cushion forms under the foil that is to be formed, which has a disturbing influence on the forming process.

In some cases, it is even possible to eliminate the use of an additional form punch. Furthermore, the time needed for the process for manufacturing the packages can be further reduced, so that higher throughput is made possible for a corresponding packaging machine. Altogether, it is consequently possible for advantages to result from the cited measures in various respects.

Furthermore, the process flow of the method or a corresponding packaging machine can generally easily be adapted or converted because only a corresponding adaptation of the valve circuit or the valve control/regulation may be necessary.

BRIEF DESCRIPTION OF THE DRAWINGS

An embodiment of the invention is depicted in the drawings; this is explained in greater detail in the following, using the figures and citing the additional advantages.

DETAILED DESCRIPTION

Figure 1:
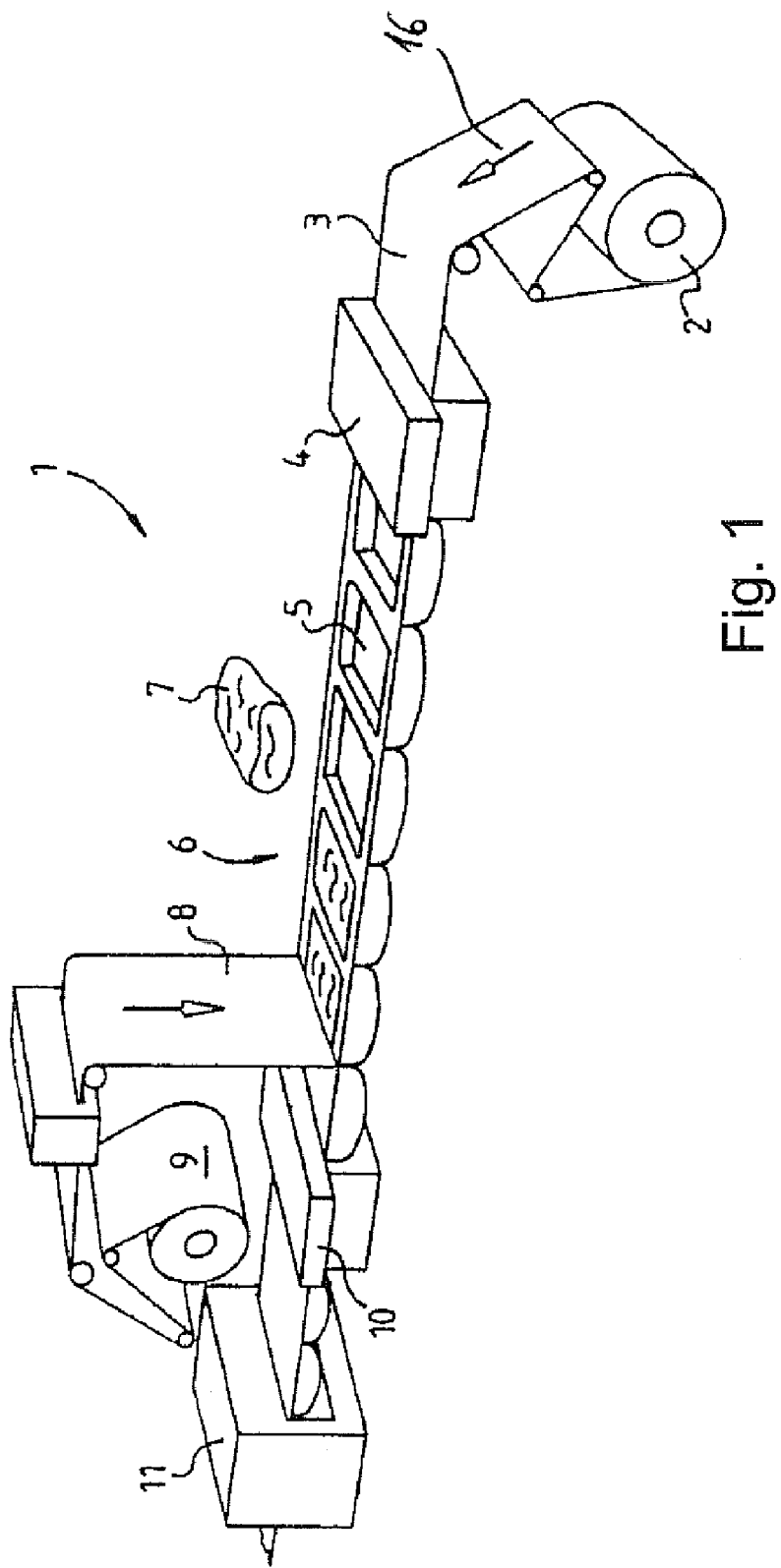
FIG. 1 is a perspective view of a packaging machine with a thermoforming station according to the invention.

FIG. 1 shows a packaging machine 1 with a roll 2 with bottom foil 3, and a forming station or thermoforming station 4 for moulding a cavity 5 in the bottom foil 3. The cavity 5 is filled with the goods 7 that are to be packaged. In the course of the process, the filled cavity 6 is covered with a top foil 8, which is unwound from a roll 9 with top foil 8, and sealed by means of a sealing station 10. Subsequently the packages can be separated by means of a cutting unit 11. The direction of the foil feed is identified by the arrow 16.

Figure 2:
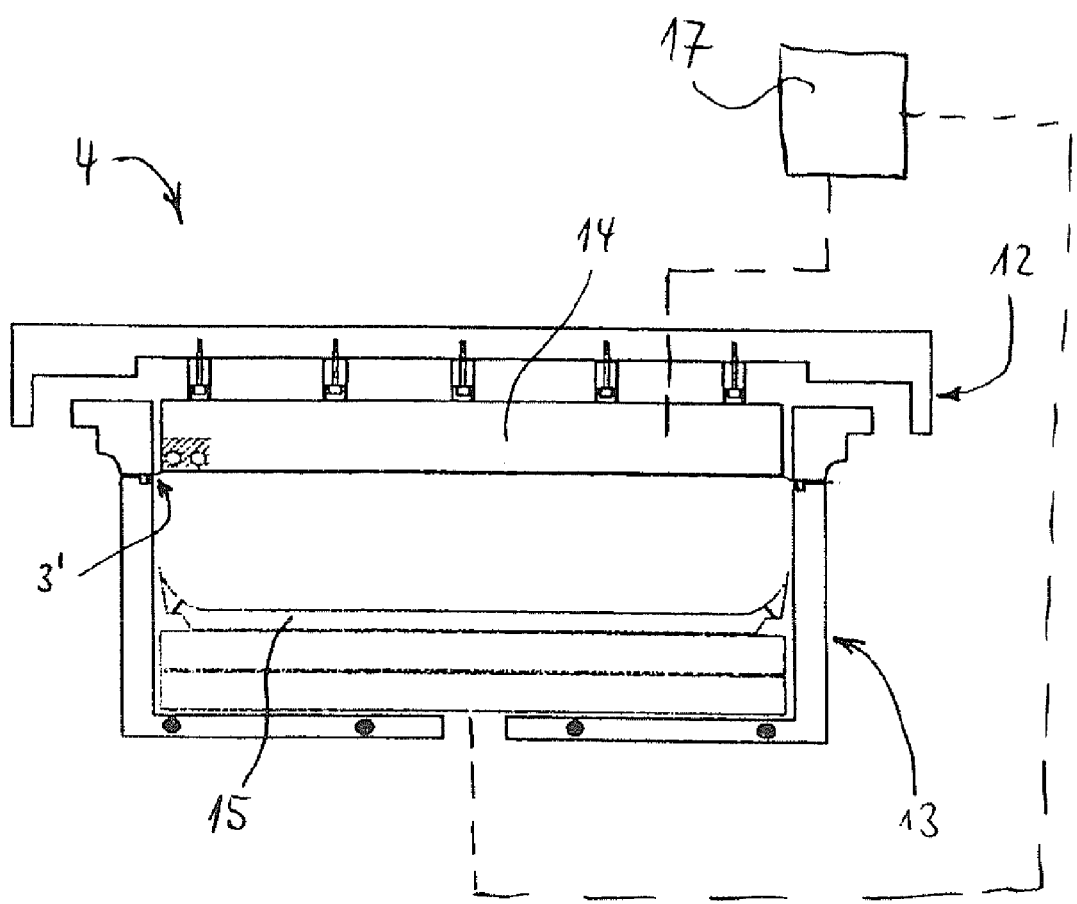
FIG. 2 is a schematic cut through a corresponding thermoforming station, in which a negative pressure is generated particularly in the top part in such a way that the foil is pressed against a heating plate.
Figure 3:
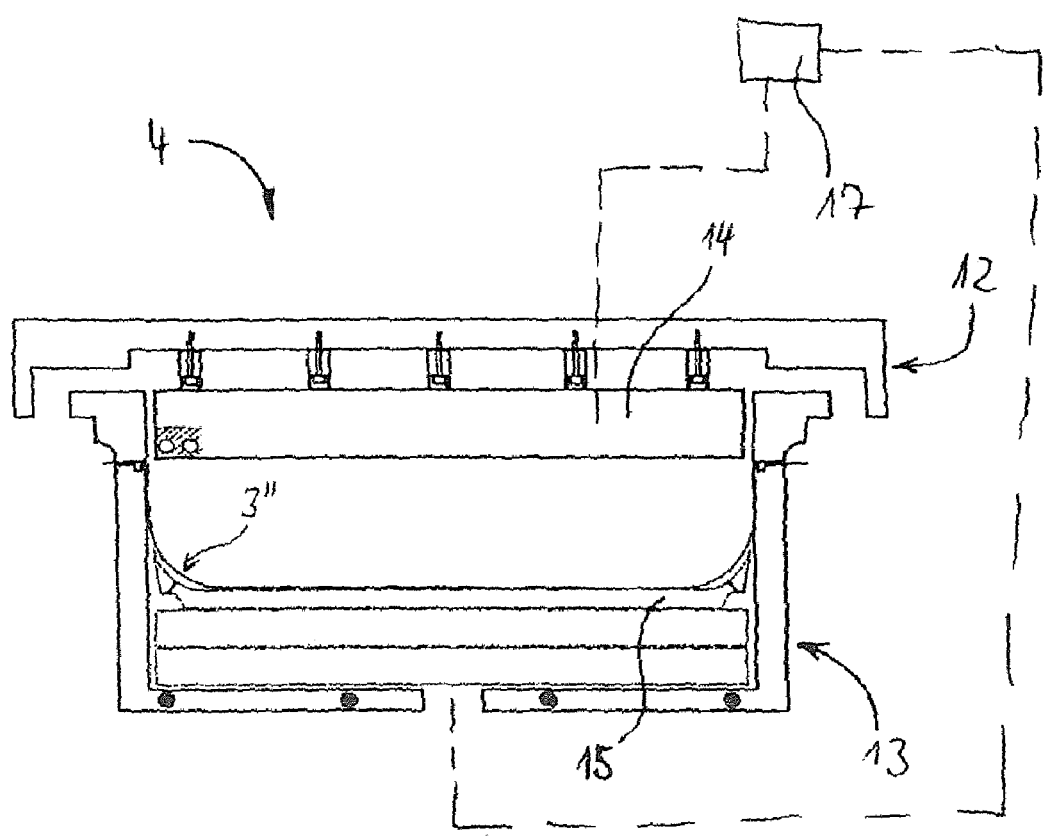
FIG. 3 is a schematic cut through a corresponding thermoforming station in which the negative pressure in the bottom part and the positive pressure in the top part of the forming station draws or presses, respectively, the foil in the direction of the mould.

A schematic cut through the thermoforming station 4 is depicted in FIGS. 2 and 3. It comprises a top part 12, in which a heating plate 14 is held, and a bottom part 13, in which a mould 15 is mounted.

In FIG. 2, negative pressure prevails in both the top part 12 and in the bottom part 13. Because the negative pressure in the top part 12 is, however, stronger than the negative pressure in the bottom part 13, the foil 3' is drawn against the heating plate 14, where it is then heated. The respective negative pressure in the top part 12 and in the bottom part 13 is generated by the device 17 for generating positive and negative pressures. This device 17 here comprises two vacuum pumps, one each for the top part 12 and the bottom part 13.

FIG. 3, on the other hand, shows a further situation during the manufacturing process of a package, in which positive pressure is generated in the top part 12 while negative pressure continues to prevail in the bottom part 13, so that the heated foil 3" is drawn in the direction of the mould 15 and the foil can fit itself to this mould. Ultimately, the heated foil can cool and solidify at the walls of the mould 15 or of the bottom part 13. To generate the positive pressure, the device 17 also comprises a pressure reservoir in order to introduce pressurized gas into the top part 12.

Figure 4:
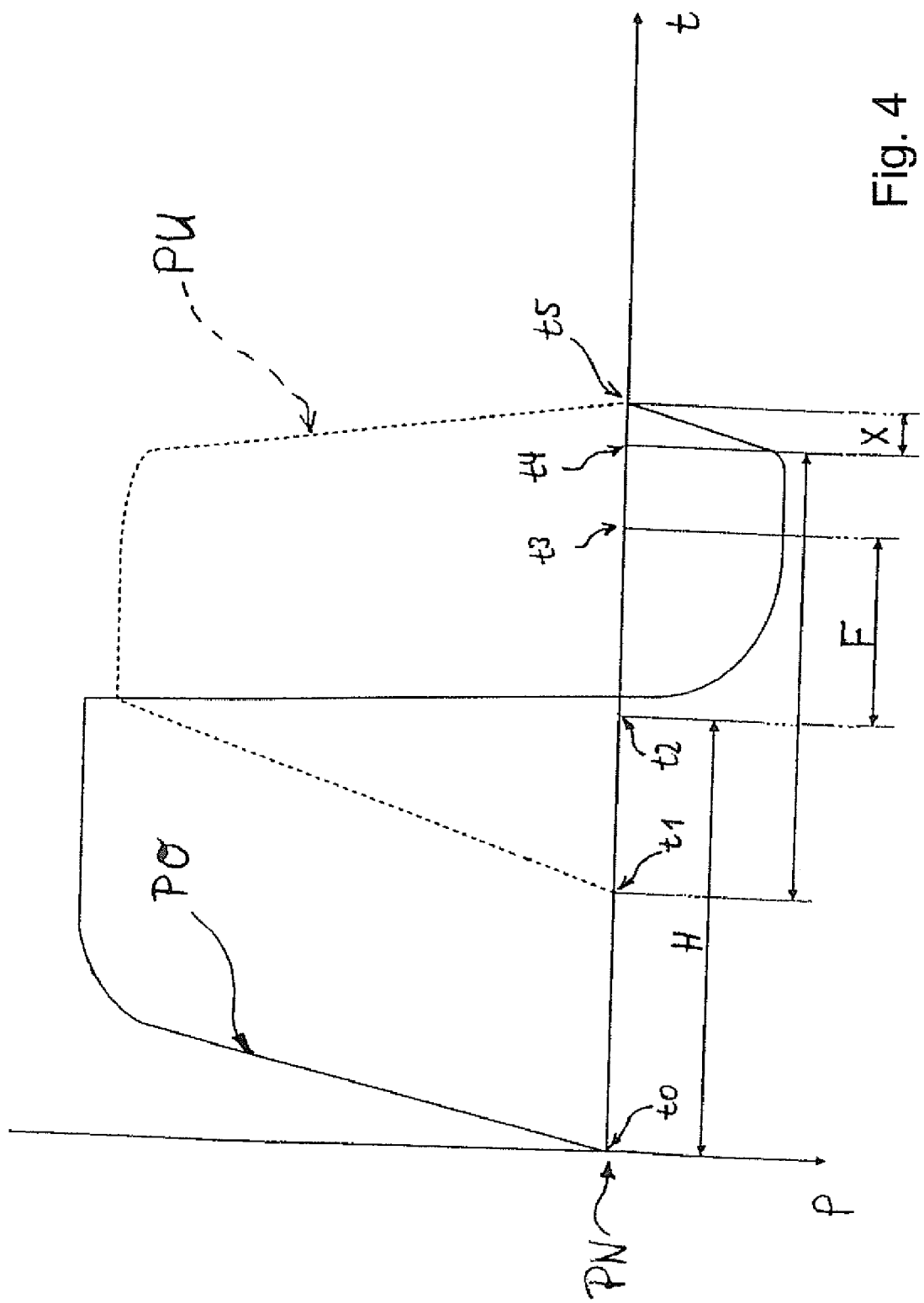
FIG. 4 is a schematic diagram which depicts the time lapses relative to the generation of the positive or negative pressures in the top and bottom part of the thermoforming station.

FIG. 4 shows the schematic process in which positive and negative pressures are controlled in the top part 12 and in the bottom part 13. The diagram in FIG. 4 here shows a time axis t and a pressure axis p, whereby a positive pressure is drawn in the direction of the arrow (downwards) and a negative pressure is drawn in the opposite direction. The intersection of the axes p and t describes on the one hand a point in time t0 on the time axis t, at which the entire process in the thermoforming station 4 begins, and on the other hand, the ambient pressure PN, meaning the normal pressure, as a rule, for example, roughly 1013 millibar, depending on the ambient and weather conditions, etc. The curve PO describes the pressure progression in the top part 12, while the curve PU describes the pressure progression in the bottom part 13.

At time t0, a negative pressure is set up in the top part 12, until a stationary negative pressure has been generated. In the meantime, the foil 3' can heat at the heating plate 14. Once a stationary negative pressure has been built up in the top part 12, a negative pressure also begins to build up in the bottom part 13 at time t1. This negative pressure in the bottom part 13 is, however initially not stronger than the negative pressure in the top part 12 during the heating process H between the points in time t0 and t2, so that the foil 3' can continue to lie on the heating plate 14 during this time.

At time t2, the forming process F begins in that the negative pressure is rapidly replaced by a positive pressure, for example, by opening and feeding a correspondingly pressurized gas volume into the top part 12. The foil 3" is drawn or pressed in the direction of the mould 15, namely comparatively swiftly, so that it can only cool slightly during this time. As a result, it can furthermore be ensured that an unequal temperature distribution within the foil 3" does not lead to various levels of clouding of the foil, and particularly to uneven draw ratios of the foil. The forming process F continues until time t3. In contact with the walls or the mould 15, the foil 3" cools and solidifies. The pressure ratios in the top part 12 and in the bottom part 13 are roughly maintained until time t4, in order to allow sufficient cooling of the foil. A cavity 5 is formed in this way. During the time period t4 to t5, the thermoforming station 4 can be vented in the top part 12 and in the bottom part 13 and the packaging process can be continued.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for manufacturing a package out of foil, the method comprising:
    moving a foil section to a position between first and second parts of a thermoforming station such that the foil section is moved with respect to both the first and second parts, the thermoforming station further including a heating device mounted on the first part such that the heating device is positioned between the first and second parts, and a mould mounted on the second part;
    heating the foil section using the heating device;

generating negative pressure relative to ambient pressure on two sides of the foil section during a time interval during the heating step; and forming a cavity in the heated foil section using the mould, wherein the cavity is configured to subsequently receive goods after being formed;

wherein the generating step comprises generating a larger negative pressure on one side of the foil section compared to the other side of the foil section, and the heating step comprises heating the foil section from the one side.

2. The method according to claim 1 wherein during a time span during the heating step, at least one stationary negative pressure is generated on one of the two sides of the foil section.

3. The method according to claim 1 wherein during the heating step, the generation of the respective negative pressure is started on the two sides of the foil section at different points in time.

4. The method according to claim 1 wherein generating a negative pressure starts on one of the two sides of the foil section as soon as or once a stationary negative pressure is present on the other side of the foil section.

5. The method according to claim 1 wherein during the heating step, the negative pressures, in terms of amount, on the two sides of the foil section are always increasing or are held constant.

6. The method according to claim 1 wherein the heating device comprises a heating plate.

7. The method according to claim 1 further comprising generating a positive pressure relative to the ambient pressure on one of the two sides of the foil section during the forming step.

8. The method according to claim 7 wherein the forming step comprises forming the heated foil section against the mould by the positive pressure on one of the two sides of the foil section and the negative pressure on the other side.

9. The method according to claim 7 wherein the positive pressure relative to the ambient pressure is generated on the side of the foil section lying opposite the mould during the forming step.

10. A method for manufacturing a package out of foil, the method comprising:

moving, from a foil roll, a foil section to a position between first and second parts of a thermoforming station of a packaging machine such that the foil section is moved with respect to both of the first and second parts, wherein one of the parts includes a heating device, and the other part includes a mould;

heating the foil section using the heating device;

generating negative pressure relative to ambient pressure on two sides of the foil section during the same time interval during the heating step;

forming a cavity in the foil section using the mould, wherein the cavity is configured to subsequently receive goods after being formed; and generating a positive pressure relative to the ambient pressure on one of the two sides of the foil section during the forming step;

wherein the step of generating negative pressure comprises generating a first negative pressure on one side of the foil section and a second negative pressure on the other side of the foil section, the first negative pressure being larger than the second negative pressure, and wherein the heating step comprises heating the foil section from the one side.

11. The method of claim 10 wherein generating negative pressure is performed such that the foil section is drawn toward the heating device during the heating step, and wherein the positive pressure relative to the ambient pressure is generated on the side of the foil section lying opposite the mould during the forming step to facilitate movement of the foil section toward the mould.

12. The method of claim 10 wherein the first negative pressure is generated on a side of the foil section lying opposite the mould to draw the foil section toward the heating device, and, after the first negative pressure has reached a steady state, the second negative pressure is generated on a side of the foil section lying opposite the heating device during at least a time period when the first negative pressure is at the steady state, and wherein the positive pressure relative to the ambient pressure is generated on the side of the foil section lying opposite the mould during the forming step.

13. The method of claim 1 wherein the larger negative pressure is a first negative pressure, and the pressure generated on the other side of the foil section is a second negative pressure, and wherein the first negative pressure is generated on a side of the foil section lying opposite the mould to draw the foil section toward the heating device, and, after the first negative pressure has reached a steady state, the second negative pressure is generated on a side of the foil section lying opposite the heating device during at least a time period when the first negative pressure is at the steady state.

14. The method of claim 1 wherein the heating device is positioned immediately adjacent the foil section during at least a portion of the heating step.

15. The method of claim 10 wherein the heating device is positioned immediately adjacent the foil section during at least a portion of the heating step.

16. The method of claim 1 wherein the larger negative pressure is generated on a side of the foil section proximate the heating device to draw the foil section toward the heating device.

17. The method of claim 10 wherein the first negative pressure is generated on a side of the foil section proximate the heating device to draw the foil section toward the heating device.

\* \* \* \* \*

UNITED STATES PATENT AND TRADEMARK OFFICE
CERTIFICATE OF CORRECTION

PATENT NO. : 8,293,152 B2
APPLICATION NO. : 12/582348
DATED : October 23, 2012
INVENTOR(S) : Bernhard Grimm Page 1 of 1

It is certified that error appears in the above-identified patent and that said Letters Patent is hereby corrected as shown below:

Title page Item (73) Assignee: delete "Multivac Sepp Haggemueller GmbH & Co. KG (DE)" and replace with "Multivac Sepp Haggenmueller GmbH & Co. KG (DE)"

Signed and Sealed this
Twelfth Day of May, 2015

Michelle K. Lee
*Director of the United States Patent and Trademark Office*